(12) United States Patent
Giampietro et al.

(10) Patent No.: US 11,000,752 B2
(45) Date of Patent: May 11, 2021

(54) COLLISION AVOIDANCE APPARATUS

(71) Applicant: Hockey Tech Systems, LLC, Lakewood, CO (US)

(72) Inventors: Rick Giampietro, Lakewood, CO (US); Jeffrey Todd Harvey, Lakewood, CO (US)

(73) Assignee: Hockey Tech Systems, LLC, Lakewood, CO (US)

( * ) Notice: Subject to any disclaimer, the term of this patent is extended or adjusted under 35 U.S.C. 154(b) by 0 days.

(21) Appl. No.: 16/426,462

(22) Filed: May 30, 2019

(65) Prior Publication Data

US 2019/0366190 A1 Dec. 5, 2019

Related U.S. Application Data

(60) Provisional application No. 62/678,070, filed on May 30, 2018.

(51) Int. Cl.
| | |
|---|---|
| *G08B 23/00* | (2006.01) |
| *A63B 71/06* | (2006.01) |
| *G08B 21/02* | (2006.01) |
| *G08B 7/06* | (2006.01) |
| *H04R 1/40* | (2006.01) |
| *H04S 7/00* | (2006.01) |
| *G09B 21/00* | (2006.01) |
| *A63B 71/00* | (2006.01) |

(52) U.S. Cl.
CPC ...... *A63B 71/0622* (2013.01); *A63B 71/0009* (2013.01); *G08B 7/06* (2013.01); *G08B 21/02* (2013.01); *G09B 21/001* (2013.01); *H04R 1/403* (2013.01); *H04S 7/303* (2013.01); *A63B 2071/0027* (2013.01); *A63B 2071/0655* (2013.01); *A63B 2071/0666* (2013.01); *A63B 2220/40* (2013.01); *A63B 2220/51* (2013.01); *A63B 2220/89* (2013.01)

(58) Field of Classification Search
None
See application file for complete search history.

(56) References Cited

U.S. PATENT DOCUMENTS

| | | | |
|---|---|---|---|
| 4,257,703 | A | 3/1981 | Goodrich |
| 5,314,037 | A | 5/1994 | Shaw et al. |
| 5,621,922 | A | 4/1997 | Rush, III |
| 6,075,857 | A | 6/2000 | Doss, Jr. et al. |
| 8,700,306 | B2 | 4/2014 | Duggan et al. |
| 8,947,195 | B1 | 2/2015 | Anvari |
| 2011/0144539 | A1 | 6/2011 | Ouchi |
| 2013/0093585 | A1 | 4/2013 | Ambani |
| 2014/0052355 | A1* | 2/2014 | Heinrichs-Bartscher ............ B60T 7/22 701/70 |
| 2016/0243443 | A1* | 8/2016 | Chuaypradit ......... A63F 13/577 |

(Continued)

*Primary Examiner* — Julie B Lieu
(74) *Attorney, Agent, or Firm* — Sheridan Ross P.C.

(57) ABSTRACT

Disclosed herein are systems and methods that relate to a modular protective system designed to be worn or incorporated into a helmet that prevent collisions with other stationary or moving objects by providing a visual and/or audible signal to the user. The system is composed of sensors that provide both directional and velocity information related to objects within the device/wearers surroundings. A computer device receives this information and translates it into a collision path and notifies the wearer of a possible collision and its trajectory.

21 Claims, 3 Drawing Sheets

(56) References Cited

U.S. PATENT DOCUMENTS

| | | | |
|---|---|---|---|
| 2018/0165976 A1* | 6/2018 | Mahnke | G01S 13/931 |
| 2018/0276891 A1* | 9/2018 | Craner | G06T 19/003 |
| 2018/0293893 A1* | 10/2018 | Yang | B60W 30/18036 |
| 2018/0317590 A1 | 11/2018 | Plain | |
| 2018/0361223 A1* | 12/2018 | Cherryhomes | A63B 71/0622 |
| 2019/0103026 A1* | 4/2019 | Liu | G06K 9/00805 |
| 2019/0108741 A1* | 4/2019 | Allen | G08B 3/10 |
| 2019/0287408 A1* | 9/2019 | Wiklinska | G08G 1/166 |
| 2020/0005608 A1* | 1/2020 | Kim | G08B 7/06 |

\* cited by examiner

COLLISION AVOIDANCE APPARATUS

CROSS REFERENCE TO RELATED APPLICATION

The present application claims the benefits of U.S. Provisional Application Ser. No. 62/678,070, filed May 30, 2018, entitled "Collision Avoidance Apparatus", which is incorporated herein by this reference in its entirety.

FIELD

This disclosure relates to systems, methods, and devices to facilitate collision avoidance.

BACKGROUND

In many activities and sports there is a high probability of an impact occurring between a person and another or a person and a stationary object. In ice hockey for example a player may be skating and not be aware of an impending body check because of the trajectory of the oncoming player. A player is exposed on their side and back and can subject to impacts in these locations. A player can also be hit in the same manner from the front if they are not skating with their head up. The surprise nature of the impact can lead to a traumatic brain injury such as a concussion or other bodily injuries. The ability of a player to avoid an impact or be able to prepare for an impact can greatly reduce the potential for injury.

As another example a motorcyclist may be unaware of an impending collision from the side or back and be subject to a vehicle impact. The simple fact that motorcycles offer far less protection to the rider from oncoming vehicles then other modes of transportation makes them vulnerable to serious impact forces. Gravitational loads on the rider can easily exceed those that can cause injury or death. The ability of a motorcyclist to avoid a collision greatly enhances their survivability. Most four wheeled vehicles are now available with a variety of electronic safety systems but motorcycles are still very limited in this application. Further there are a significant number of legacy motorcycles on the roads that could benefit through an add-on technology.

This technology is design to be utilized in several ways; it can be incorporated directly into a sports or riding helmet or it can be utilized as a standalone system for people in motion without helmets such as bicycles or as an add-in system for legacy vehicles.

SUMMARY

These and other needs are addressed by the various embodiments and configurations of the present disclosure.

The following presents a simplified summary of the disclosure in order to provide an overview of the disclosure. This summary is not an extensive summary of the disclosure. It is intended to neither identify key or critical elements of the disclosure nor delineate any scope of particular embodiments of the disclosure, or any scope of the claims. The sole purpose is to present certain concepts of the disclosure in a simplified form, a detailed description follows.

As an introduction, this disclosure relates to systems, methods, and devices for protecting sports participants or other moving people like motorcyclists from colliding with objects including stationary objects like arena boards, nets, stanchions, vehicles, or moving objects such as other players or vehicles. In particular, the systems and methods disclosed herein describe a system that facilitates the ability the device user to avoid contact with objects through the notification—visually and/or audibly of an impending impact. As a non-limiting example of a disclosed system; the system consists of hardware and software components each with several distinct modules. The hardware consists of a sensor array (a plurality of sensors), an accelerometer array, an alert system, a central processing unit, memory storage, data transmitter and a power source. The software consists of a translation module, a trajectory module, a force module and an alert module.

Overall, the system disclosed herein enables the device to track objects relative to its position and calculate trajectories and provide alerts related to possible collisions paths. Further, the device can measure acceleration and deceleration of the device to calculate loads delivered to the user.

In accordance with one or more embodiments and corresponding disclosure, various non-limiting aspects are described in connection with systems and methods for monitoring object trajectory and applied forces relating to sports use. In an embodiment, a system is provided comprising a memory that stores executable components; and a processor, coupled to the memory, that executes the executable components to perform operations of the system, the executable components comprising: a translation module, a trajectory module, a force module and an alert module.

In an aspect, a translation module converts the signals from the sensor and accelerometer arrays into signals that the processor can utilize. The trajectory module calculates the path of objects relative to the user and provides collision probabilities to the processor. The force module calculates the loads received by the user based on data translated from the accelerometer array. The trajectory module will send collision warnings to the alert module which will trigger visual and/or audible alerts to the user through the alert system.

The alert system consists of components that provide the user with visual cues as to an impending collision through a set of two directionally located LEDS or similar devices. The blinking light indicates the direction of impending impact (the left, the right light, solid for head on or both blinking for a rear collision) and the rate of blinking provides the rate of closure of the object or its relative velocity. Similarly, a set of two speakers are mounted near the user's ears with both a left and right component. An audible cue provides the direction of the impending impact and the rate of the audible cue indicates the rate of closure of the object. In one embodiment the audible cue could be a generated sound such as a beep or similar sound and in a second embodiment it could be a recorded voice.

The alert system also provides an indicator that illuminates should the user be subjected to excessive acceleration or deceleration as translated into gravitational forces. The threshold level for this trigger is adjustable to allow for tailoring of the alert. In one embodiment the system allows the user to download a time series data stream of the forces received by the device during its use. In one embodiment a coach could use the force indicator to remove a player from play for a concussion evaluation if the device indicated that it had received excessive forces.

In yet another aspect, the system could be linked to an external display that could be mounted on a vehicle. This display would show object trajectories and provide the user with visual cues via a screen. In one embodiment the visual cues could be a flashing symbol indicating which object path possesses the highest threat.

In one embodiment the system is powered by a battery pack that could be rechargeable. In yet another embodiment, the system could be powered from a vehicle's power source via a cord.

The following description and the appended drawings set forth certain illustrative aspects of the disclosure. These aspects are indicative of only select methods in which the principles of the disclosure may be employed. Further aspects of the disclosure will become apparent from the detailed description of the disclosure when considered in conjunction with the drawings.

The present disclosure can provide a number of advantages depending on the particular configuration.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "moving object detection" refers to a technique used in computer vision and image processing. Multiple consecutive frames from a video are compared by various methods to determine if any moving object is detected.

The term "object tracking" refers to a computer technology related to computer vision and image processing that deals with detecting instances of semantic objects of a certain class (such as humans, buildings, or cars) in digital images and videos. Methods for object detection generally fall into either machine learning-based approaches or deep learning-based approaches. For Machine Learning approaches, it becomes necessary to first define features using one of the methods below, then using a technique such as support vector machine (SVM) to do the classification. On the other hand, deep learning techniques that are able to do end-to-end object detection without specifically defining features, and are typically based on convolutional neural networks (CNN). Machine learning approaches can include Viola-Jones object detection framework based on Haar features, scale invariant feature transform, and histogram of oriented gradients features. Deep learning approaches can include Region Proposals (R-CNN, Fast R-CNN, Faster R-CNN), Single Shot MultiBox Detector (SSD), and You Only Look Once (YOLO).

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

Non-limiting and non-exhaustive embodiments of the present disclosure are described with reference to the following drawings. In the drawings, like reference numerals refer to like parts throughout the various figures unless otherwise specified.

For a better understanding of the present disclosure, reference will be made to the following detailed description, which is to be read in association with the accompanying drawings wherein.

DETAILED DESCRIPTION

Figure 1:
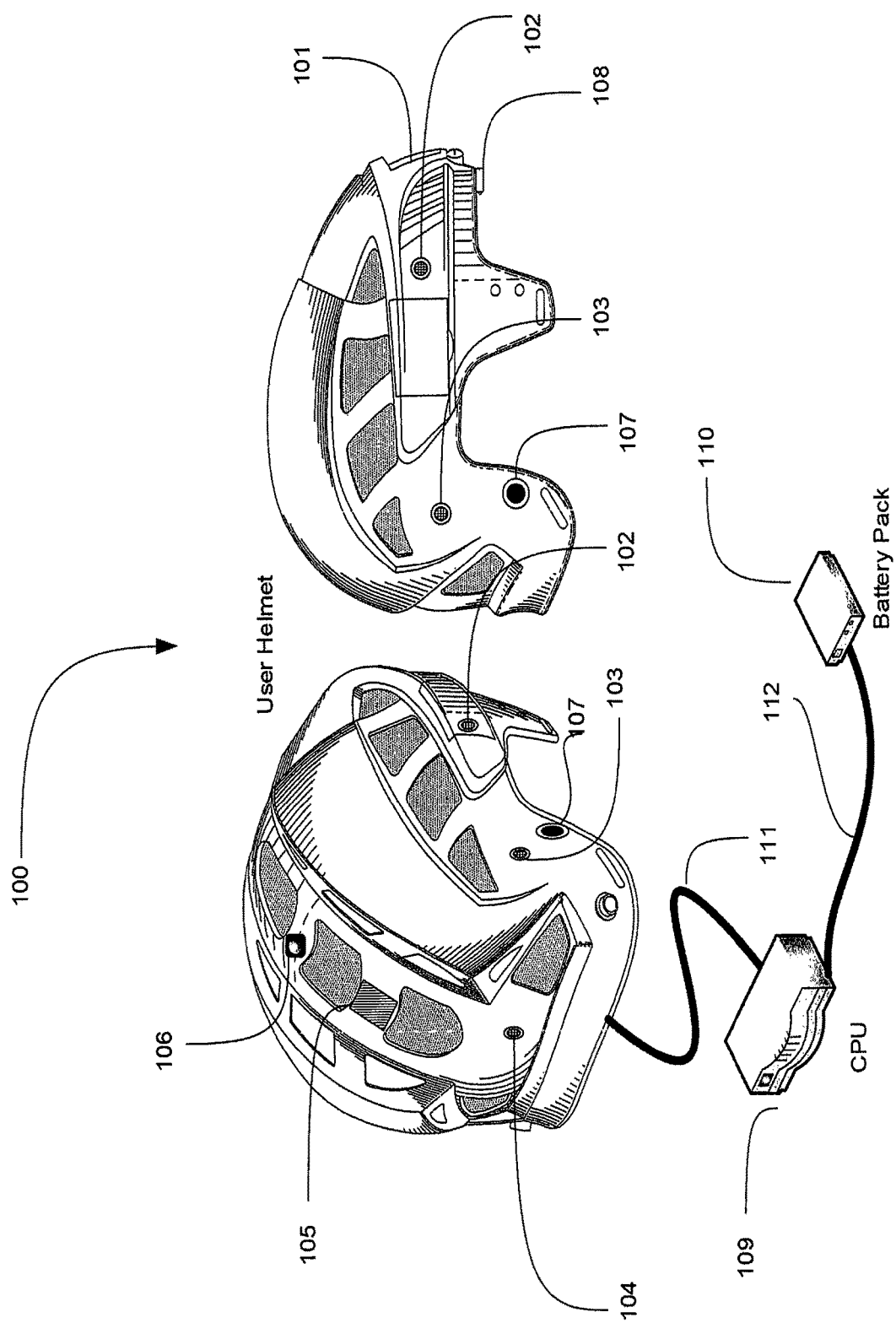
FIG. 1 shows components of an environment in which one or more embodiments of the disclosure may be practiced.

Disclosed herein are systems, methods and devices avoiding collisions between a user and other objects. FIG. 1 shows components of an environment in which one or more embodiments of the disclosure may be practiced. Not all the components may be required to practice the disclosure, and variations in the arrangement and type of the components may be made without departing from the spirit of the disclosure. As shown, system 100 of FIG. 1 includes a plurality of trajectory or object tracking sensors 101-104, accelerometer array 105, force indicator 106, a set of speakers 107, a visual indicator 108, processor 109, battery pack 110 and connection cables 111-112.

One embodiment of device 100 is described in more detail below in conjunction with FIG. 2. Device 200 may include many more or less components than those shown in FIG. 2. However, the components shown are sufficient to disclose an illustrative embodiment for practicing the present disclosure. User device 200 may represent, for example, all components of FIG. 1. As shown in the figure, client device 200 includes a processing unit (CPU) 201 in communication with a mass memory 223 via a bus 222. Client device 200 also includes a power supply 213, one or more network interfaces 219, an audio cue system 214, visual cue system 215, a force indicator 216, a charge indicator 217, an input/output interface 218, an accelerometer array 220, and a trajectory sensor array 221. Power supply 213 provides power to client device 200. A rechargeable or non-rechargeable battery may be used to provide power. The power may also be provided by an external power source, such as an AC adapter that recharges a battery.

Client device 200 may optionally communicate directly with another computing device. Network interface 219 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, Bluetooth™, ultra Wide band (UWB), IEEE 802.16 Worldwide Interoperability for Microwave Access (WiMax), SIP/RTP, or any of a variety of other Wireless communication protocols. Network interface 219 is sometimes known as a transceiver, a transceiving device, or network interface card (NIC).

Audio Cues 214 is arranged to produce audio signals such as the sound of a human voice or electronic beep. For example, Audio Cues 214 is coupled to a speaker to enable communication with user and/or generate an audio acknowledgement for some action. Visual Cues 215 may be a light emitting diode (LED), conventional bulb, or any other type of light source. Further, Visual Cues could provide data to a display for remote visualization of object trajectories such as for a motorcyclist.

Force Indicator 216 may be a light or a speaker. For example, a light consisting of an LED or conventional bulb may be used to indicate sustained force status or a speaker may emit a sound when excessive force has been applied to the user.

Charge Indicator (not shown) could be a light or a series of lights or an audible alert that indicate the charge status of the battery pack. The battery pack should have a minimum suitable charge so as to allow the user to complete a given task—an hour for an average hockey game for example.

Figure 2:
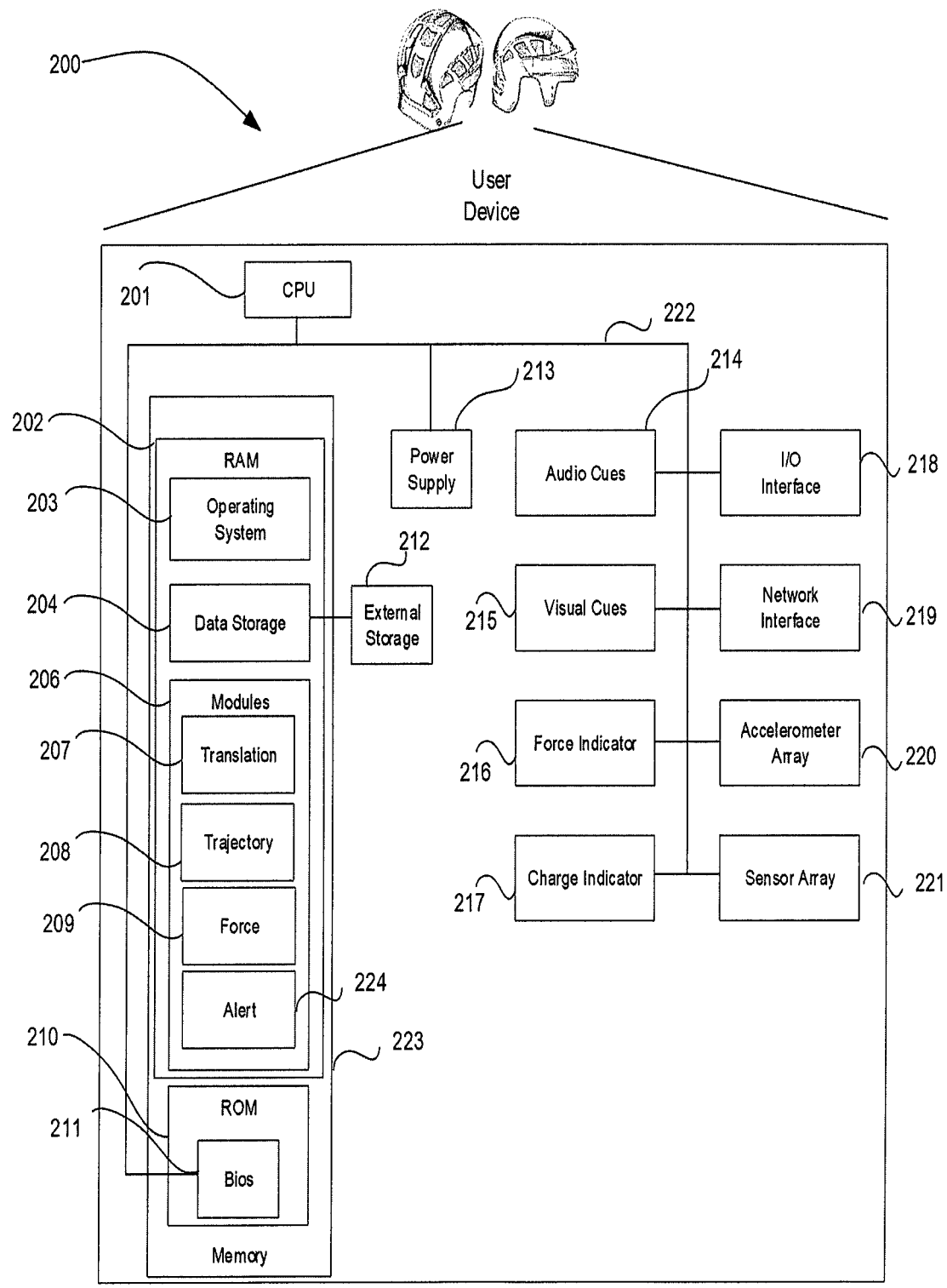
FIG. 2 shows one embodiment of a device that may be included in a system implementing one or more embodiments of the disclosure.

Client device 200 also comprises input/output interface 218 for communicating with external devices, such as a USB memory card, separate computing device or other input or output devices not shown in FIG. 2. Input/output interface 218 can utilize one or more communication technologies, such as USB, infrared, Bluetooth™, or the like.

An Accelerometer Array 220 can determine the physical gravitational forces applied to the user in three planes and provide that data to the CPU 201 for analysis. An accelerometer is an electromechanical device used to measure acceleration forces. Such forces may be static, like the continuous force of gravity or, as is the case with many mobile devices, dynamic to sense movement or vibrations. Acceleration is the measurement of the change in velocity, or speed, divided by time. The Accelerometer Array 220 may be a bulk micromachined capacitive system, bulk micromachined piezoelectric resistive system, a capacitive spring mass system base system, a DC response system, an electromechanical servo (Servo Force Balance) system or similar system that can measure forces applied to the user.

The Sensor Array 221 can determine the location of objects within its range. Further, this information can be utilized by the CPU and associated modules to determine object's trajectory relative to the user. The Sensor Array 221 consists of a plurality of sensors to provide a 360-degree view of objects within its range. The Sensor Array 221 can consist of ultrasonic sensors, ultraviolet sensors, infrared sensors, laser sensors, pulse radars, continuous radars, RF sensors, sonar sensors, LIDAR sensors, cameras or similar devices that can determine an objects location relative to its position. In another embodiment the Sensor Array 221 communicates via a variety of described methods with other Sensor Arrays located on other users within specified ranges. The Sensor Array uses triangulation or other technology like GPS to determine distance, location and closing speed and the like, of the other users within range.

Mass memory 223 includes a RAM 202, a ROM 210, and other storage means. Mass memory 223 illustrates another example of computer storage media for storage of information such as computer readable instructions, data structures, program modules or other data. Mass memory 223 stores a basic input/output system ("BIOS") 211 for controlling low-level operation of the device 200. The mass memory also stores an operating system 203 for controlling the operation of mobile device 200. It will be appreciated that this component may include a general purpose operating system such as a version of UNIX™, or LINUX™, or a specialized client communication operating system such the Apple™ iOS™ or Google™ Android™ operating system or the like. The operating system may include, or interface with a Java virtual machine module that enables control of hardware components and/or operating system operations via Java application programs.

Memory 223 further includes one or more data storage 204, which can be utilized by client device 200 to store, among other things, applications 206 and/or other data. For example, data storage 204 may also be employed to store information that describes various capabilities of mobile device 200. The information may then be provided to another device, including being sent as part of a header during a communication, sent upon request, or the like. Moreover, data storage 204 may also be employed to store historical, operating times, dates, battery status, uploads/downloads, or the like. At least a portion of the data may also be stored on storage medium 212, such as a solid state memory device, or the like within device 200.

Application Modules 206 may include computer executable instructions which, when executed by device 200, provide such functions as data translation, trajectory calculations, forces calculations, trigger visual and audio cues, transmit data, and so forth. Applications 206 may further include Translation Module (TM) 207. TM 207 represents any of a variety of applications configured to transmit, receive, and/or otherwise process data from the various sensors that are part of the client device. In one embodiment TM 207 can provide messages and other content, including, but not limited to SMS, MMS, IM, email, VOIP, browsers, or the like, and to enable telecommunication with another user of another networked device.

TM 207 may further include an IM application that is configured to initiate and otherwise manage an instant messaging session, including, but not limited to SnapChat™, Yahoo!™ Messenger, NET Messenger Server, ICQ™, and the like. In one embodiment, the IM application within TM 207 may be configured to employ a SIP/RTP to integrate IM/VOIP features. For example, the IM application may employ SIMPLE (SIP for Instant Messaging and Presence Leverage), APEX (Application Exchange), Prim (Presence and Instant Messaging Protocol), Open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

TM 207 may also include text messaging application(s) that enables client device 200 to receive and/or send text messages to another device. The text messaging application(s) may operate to manage SMS text messages, MMS messages, Enhanced Message Service (EMS) messages, or the like, where graphics, video clips, sound files, or other content may be communicated between client device 200 and another networked device.

Trajectory Module 208 (TJ 208) represents a variety of applications configured to calculate the trajectory or objects relative to the sensor position or otherwise perform moving object detection. TJ 208 must calculate the objects location, speed or acceleration of approach and develop trajectory paths in a 360-degree circle around the user from data provided by the Sensory Array 221. Further, TJ 208 will be able to formulate the track changes as the client device is rotated and be able to associate objects as they transition from sensor to senor either due to their movement or the client device movement. TJ 208 will calculate the probability of collisions and trigger the Alert Module 224 (AM 224) to take action.

TJ 208, for example, can be an extended Kalman filter. As will be appreciated, other types of mathematical systems that provide estimations of past, present, and future states of an object based on direction angles or vector direction obtained by one or more types of sensors can be employed.

Force Module 209 (FM 209) represents a variety of applications configured to calculate the forces applied to the client device. FM 209 must calculate the forces applied to the user from Accelerometer Array 220 data. FM 209 will calculate the gravitational forces applied to the user and if they exceed a predetermined limit, trigger the Alert Module 224 (AM 224) to take action.

Alert Module (AM 224) represents a variety of applications configured to operate the various notifications systems of Client device 200. AM 224 can change the status of the trigger in the Force Indicator 216 based on information received from FM 209. Force Indicator 216 could be a light or a speaker and be set to change color, flash, beep or the like. Further, AM 224 will manage the translation of collision paths into visual and audio cues. AM 224 will control the output of Visual Cues 215 and Audio Cues 214 to provide the user with feedback related to possible object collision. In one embodiment AM 224 may cause the Visual Cues to blink on the collision approach side of the light pairs at a rate that changes with approach distance and velocity. Further, AM 224 may cause the Audio Cues to play a sound on the collision approach side of the speakers at a rate that changes with approach distance and velocity.

Alert Module 224 can take other forms.

For example, the AM 224 can provide audible feedback that changes in volume and/or frequency and/or pitch to enhance sensory perception of a current location, speed, acceleration, and/or direction of travel of an approaching object, and/or likelihood that the approaching object will impact the user. For example, 3D sound localization and/or synthesis techniques may be employed. The number and locations of speakers in the helmet are selected to simulate spatial sound. The signal indicating the position, speed, acceleration, travel direction, and/or likelihood of an approaching object can be varied in volume, frequency, and/or pitch at each speaker to enable the user to perceive the associated position, speed, acceleration, travel direction, or likelihood of an approaching object. Stated differently, each of plural speakers will emit sound of differing volume and/or frequency and/or pitch depending on the relative location of the corresponding speaker to a current or estimated position of the object. The 3D sound can enable the user to keep his or her eyes on the players before him or her without distraction by visual cues. In another embodiment, a human or synthesized voice is provided to the user through one or more speakers providing the user with directions to avoid collision with or, if unavoidable, to position his or her body to collide with the approaching object.

In another example, the current location, speed, acceleration, and/or direction of travel of an approaching object, and/or likelihood that the approaching object will impact the user can be tactilely communicated to the user. For example, the helmet or a body part of the user can comprise or be in contact with, respectively, a plurality actuators or inflatable/deflatable pads that are activated and deactivated selectively to indicate the current or estimated location, speed, acceleration, and/or direction of travel of an approaching object. In other words, the actuators or pads nearest the object or at the likely point of impact of the object can be actuated so as to contact the skin of the user, thereby warning the user of the impact and indicating a direction for the user to travel to avoid the impact. In another embodiment a plurality of vibrators that are activated and deactivated selectively to indicate the current or estimated location, speed, acceleration, and/or direction of travel of an approaching object. The vibrators could be electromechanical or purely electrical or the like. The vibrators could be incorporated into the helmet or in contact with the user on other body locations.

In another embodiment, the AM 224 communicates wirelessly with an AM 224 in one or more surrounding devices 100 providing not only a unique identity (e.g., IP address or other identifier) of the device 100 and/or the associated user but also one or more of current associated user position relative to a common reference system of coordinates (such as GPS), a current or estimated bearing or direction of travel of the associated user, a speed or acceleration of the associated user, and an estimated position of the associated user relative to the coordinate system at a selected time. In this manner, the AMs of the various devices 100 can direct its associated user to follow a bearing or direction of travel to avoid a collision, to reduce a speed or acceleration of the associated user to reduce an impact force of a collision, to be in an estimated position at the selected time, and the like.

Generalized Operation

Figure 3:
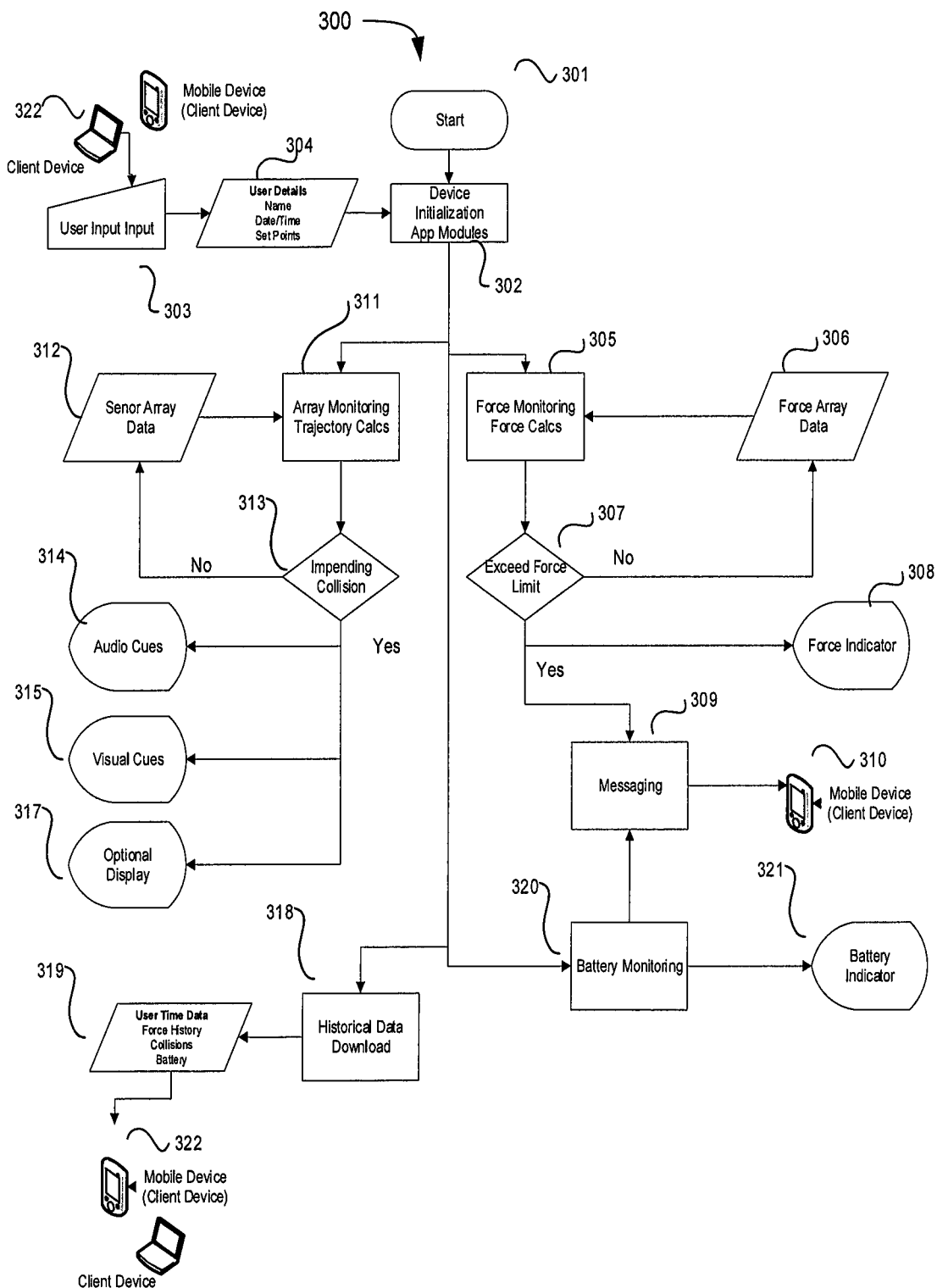
FIG. 3 shows one embodiment of a network device that may be included in a system implementing one or more embodiments of the disclosure.

The workflow and general operation of the disclosure will be described in FIG. 3. FIG. 3 shows the logical workflow diagram of certain aspects of the disclosure.

The process 300 begins with a start block 301 where the client device is initiated 302. In this embodiment a new event is created by client device 322. In one embodiment the operator inputs certain data 303 related to the event including the user name, date and set points for acceptable forces 304. The operator starts the device and the data is uploaded to commence operation. The Force Module 209 monitors the forces received by the device 306 and calculates loads applied 305. A decision block 307 determines if the loads exceed the set point and if so triggers Alert Module 224 and activates the Force Indicator 308. If the forces do not exceed the set point monitoring is maintained. In another embodiment, the Alert Module 224 triggers a mobile message 309 to a client device 310. The Trajectory Module 208 monitors the data from the sensor array 312 and computes trajectories 311. If an impending collision path is determined 313, the Alert Module 224 triggers the Audio 314 and Visual Cues 315. In one embodiment and optional display 317 is utilized to visualize the collision paths. The Battery health is monitored 320 and the battery indicator 321 is adjusted to represent the condition.

At the termination of the event the historical data collected during the event may be downloaded 318 as a time series data stream 319 to a client device 322. In one embodiment a continuous data stream is provided to client device 322 during the event.

The event, for example, can be a hockey game, skateboarding, motorcycling, or bicycling, snowboarding, skiing, lacrosse, baseball, basketball, rugby, and football. Any of these activities can be performed by a blind or visually unimpaired user.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22nm Haswell, Intel® Core® i5-3570K 22nm Ivy Bridge, the AMD® FX™ family of processors, AMD® FX-4300, FX-6300, and FX-8350 32nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to collision avoidance systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

For example in one alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A user wearable system, comprising:
   one or more object tracking sensors;
   one or more force sensors;
   a computer readable memory comprising processor executable modules; and
   a processor, coupled to the computer readable memory, that executes or facilitates execution of the processor executable modules, the processor executable modules comprising:
   a trajectory module that processes data received from the object tracking sensors to calculate a trajectory of an object within a spatial vicinity of a user;
   a force module that calculates a force applied to the user wearable system from data received from force sensors; and
   an alert module that receives a calculated object trajectory signal from the trajectory module and a calculated applied force signal from the force module and determines if an alert should be provided to the user regarding the force from a collision and the trajectory of an object likely to collide with the user.

2. The system of claim 1, wherein the user wearable system is a projective helmet.

3. The system of claim 1, wherein the calculated applied force is uploaded to a remote communication device to alert a different user when the calculated applied force exceeds a selected threshold.

4. The system of claim 3, wherein details of an associated event including a username, date, and time are uploaded in association with the calculated applied force to the remote communication device.

5. The system of claim 1, wherein the alert is one or more of visual, audible, and tactile.

6. A user wearable device, comprising:
one or more trajectory sensors to track paths of objects relative to the user wearable device;
one or more force sensors to measure gravitational loads applied to the user wearable device;
a user interface to notify a user of an impending collision with an object and a direction of travel of the object; and
a network interface to notify a remote communication component that an excessive force has been applied to the user.

7. The device of claim 6, wherein the user wearable device is a projective helmet.

8. The device of claim 6, wherein a force applied to the device is calculated from data recieved from the one or more force sensors and is uploaded to a remote communication device to alert a different user when the applied excessive force exceeds a selected threshold.

9. The device of claim 8, wherein details of an associated event including a username, date, and time are uploaded in association with the applied excessive force to the remote communication device.

10. The device of claim 8, wherein the notification of the impending collision with the object and the direction of travel of the object is visually conveyed by a display or light.

11. The device of claim 8, wherein the notification of the impending collision with the object and the direction of travel of the object is audibly conveyed by a sound emitted by a plurality of speakers and wherein the plurality of speakers convey to the user a relative current or estimated location of the object by 3D sound synthesis and/or localization techniques.

12. The device of claim 8, wherein the notification of the impending collision is tactilely conveyed by contacting a skin of the user at a location of a potential impact with the object.

13. A method comprising:
detecting, by wearable device comprising one or more trajectory sensors, an object approaching a user;
determining, by a processor in the wearable device, that a collision of the user with the object has at least a threshold likelihood of occurring; and
providing, by the processor, an audible, visual, and/or tactile warning to the user of a current or estimated location, travel direction, speed, or acceleration of the object,
wherein at least one of the following is true;
(i) the step of detecting further comprises detecting multiple objects approaching the user, determining trajectories of each of the multiple objects, and displaying the trajectories of each of the multiple objects on an external display device to be viewed by the user; and
(ii) the wearable device uses a communication between other devices for trCking and recording the user's movements.

14. The method of claim 13, further comprising:
communicating an applied force applied by a collision of the object with the user to a remote communication device to alert a different user when the applied force exceeds a selected threshold, wherein details of an associated event including a username, date, and time are uploaded in association with the applied force to the remote communication device.

15. The method of claim 13, wherein the warning is visually conveyed by a display or light.

16. The method of claim 13, wherein the warning is audibly conveyed by a sound emitted by a plurality of speakers, wherein the plurality of speakers convey to the user a current or estimated relative location of the object by 3D sound synthesis and/or localization techniques.

17. The method of claim 13, wherein the warning is tactilely conveyed by contacting a skin of the user at a location of a potential impact with the object.

18. The method of claim 13, wherein the warning is tactilely conveyed by vibration device contacting the user at a location of a potential impact with the object.

19. The method of claim 13, further comprising:
communicating, to a wearable device of another user, a current or estimated location and/or direction of travel of the wearable device.

20. The method of claim 13, wherein the wearable device comprises a camera for tracking and recording the user's movements.

21. The method of claim 13, wherein the wearable device is incorporated into a sporting event helmet and is worn by a seeing impaired users during a blind sporting event and allows the user to locate an object of play through additional communications directly with said object of play, the object of play comprising a ball or puck.

* * * * *